(12) United States Patent
Huang

(10) Patent No.: US 9,424,434 B2
(45) Date of Patent: Aug. 23, 2016

(54) PERSONAL ELECTRONIC DEVICE AND DATA THEFT PREVENTION SYSTEM AND METHOD THEREOF

(71) Applicant: Wistron Corp., New Taipei (TW)

(72) Inventor: Kuan-Ju Huang, New Taipei (TW)

(73) Assignee: Wistron Corp., New Taipei (TW)

( * ) Notice: Subject to any disclaimer, the term of this patent is extended or adjusted under 35 U.S.C. 154(b) by 194 days.

(21) Appl. No.: 14/225,319

(22) Filed: Mar. 25, 2014

(65) Prior Publication Data

US 2015/0205972 A1    Jul. 23, 2015

(30) Foreign Application Priority Data

Jan. 29, 2014  (TW) .............................. 103103422 A

(51) Int. Cl.
*G06F 21/62* (2013.01)
*G06F 21/88* (2013.01)

(52) U.S. Cl.
CPC ............ *G06F 21/6218* (2013.01); *G06F 21/88* (2013.01)

(58) Field of Classification Search
CPC ............................. G06F 21/6218; G06F 21/88
See application file for complete search history.

(56) References Cited

U.S. PATENT DOCUMENTS

| | | | | |
|---|---|---|---|---|
| 5,892,906 A * | 4/1999 | Chou | ..................... | G06F 21/31 713/2 |
| 6,300,863 B1 * | 10/2001 | Cotichini | .............. | G06F 11/006 340/10.42 |
| 2004/0111640 A1 * | 6/2004 | Baum | ................. | H04L 61/2015 726/13 |
| 2009/0183266 A1 * | 7/2009 | Tan | ......................... | G06F 21/88 726/35 |
| 2010/0216429 A1 * | 8/2010 | Mahajan | ................. | G06F 21/88 455/411 |
| 2010/0229220 A1 * | 9/2010 | Tsai | ........................ | G06F 21/88 726/4 |
| 2010/0229248 A1 * | 9/2010 | Glave | ...................... | G06F 21/88 726/34 |
| 2011/0072520 A1 * | 3/2011 | Bhansali | ................. | G06F 21/88 726/27 |
| 2011/0076986 A1 * | 3/2011 | Glendinning | .......... | G06F 21/88 455/411 |
| 2013/0159727 A1 | 6/2013 | Sarangdhar et al. | | |

FOREIGN PATENT DOCUMENTS

| | | |
|---|---|---|
| TW | 200812332 A | 3/2008 |
| TW | 201346632 A | 11/2013 |
| TW | 201349824 A | 12/2013 |

OTHER PUBLICATIONS

Taiwan Patent Office, Office Action, Patent Application Serial No. 103103422, Jul. 3, 2015, Taiwan.

* cited by examiner

*Primary Examiner* — Matthew Smithers

(57) ABSTRACT

Data theft prevention technology for a personal electronic device is provided. When an internet-communication address of the personal electronic device is detected by a server through the internet and the server determines that the detected internet-communication address has been listed in a lost list, a processing unit of the personal electronic device operates in accordance with anti-theft software to execute the codes contained in a BIOS memory of the personal electronic device to set a medium password for a user-data storage medium of the personal electronic device and to prohibit the use of the personal electronic device.

14 Claims, 3 Drawing Sheets

PERSONAL ELECTRONIC DEVICE AND DATA THEFT PREVENTION SYSTEM AND METHOD THEREOF

CROSS REFERENCE TO RELATED APPLICATIONS

This Application claims priority of Taiwan Patent Application No. 103103422, filed on Jan. 29, 2014, the entirety of which is incorporated by reference herein.

BACKGROUND OF THE INVENTION

1. Field of the Invention

The present invention relates to personal electronic devices, and it particularly relates to data security of user-data storage mediums of personal electronic devices.

2. Description of the Related Art

With advances in technology, personal electronic devices are more and more convenient and have an increasing capacity of their user-data storage mediums (such as a hard disc of a personal computer or a flash memory generally used in a personal electronic device.) Personal electronic devices are frequently used and deeply relied on today. Thus, the security of user-data storage medium in which the user stores data is more and more important.

Data theft prevention is an especially important issue in cases involving a personal electronic device getting lost or stolen.

BRIEF SUMMARY OF THE INVENTION

Several exemplary embodiments of a data theft prevention technology for a personal electronic device are shown.

A personal electronic device in accordance with an exemplary embodiment of the disclosure comprises a user-data storage medium, an internet-communication interface, a Basic Input/Output System memory (BIOS memory) and a processing unit. An internet-communication address is contained in the internet-communication interface. When the internet-communication address of the personal electronic device is detected by a server through the internet and the server determines that the detected internet-communication address has been listed in a lost list, the processing unit operates in accordance with anti-theft software to execute the codes contained in the BIOS memory to set a medium password for the user-data storage medium and to prohibit the use of the personal electronic device.

A data-theft prevention system established for the aforementioned personal electronic device is further disclosed. In addition to the aforementioned personal electronic device, a data theft-prevention system in accordance with an exemplary embodiment of the disclosure further comprises the aforementioned server. The lost list is stored in the server. When a personal electronic device of the disclosure gets lost, the internet-communication address of the lost personal electronic device is updated into the lost list. The server searches through the internet for the lost personal electronic device based on the internet-communication address recorded in the lost list.

A data-theft prevention method for a personal electronic device in accordance with an exemplary embodiment of the disclosure comprises: loading an internet-communication interface of the personal electronic device with an internet-communication address of the personal electronic device; installing anti-theft software onto the personal electronic device; and, when the internet-communication address of the personal electronic device is detected by a server through the internet and the server determines that the detected internet-communication address has been listed in a lost list, executing the codes contained in a BIOS memory of the personal electronic device in accordance with the anti-theft software to set a medium password for a user-data storage medium of the personal electronic device and to prohibit use of the personal electronic device.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
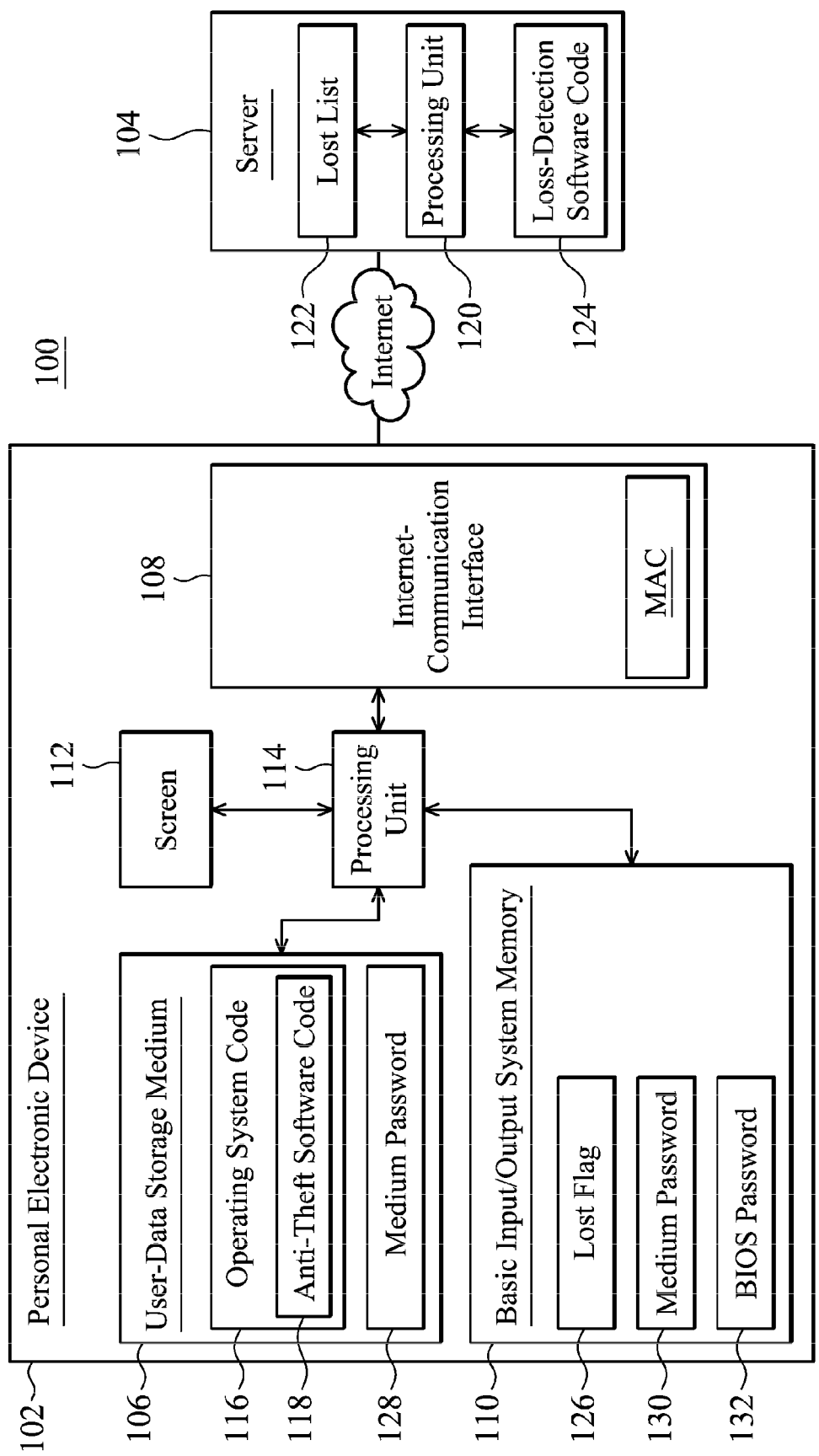
FIG. 1 is a block diagram depicting a data-theft prevention system 100 for a personal electronic device in accordance with an exemplary embodiment of the disclosure.

FIG. 1 is a block diagram depicting a data-theft prevention system 100 for a personal electronic device 102, which includes the personal electronic device 102 as well as a server 104.

The personal electronic device 102 includes a user-data storage medium 106 (e.g., a hard disc of a personal computer or a flash memory generally used in a portable device, and so on); an internet-communication interface 108 with an internet-communication address MAC (e.g., a medium access control address); a Basic Input/Output System memory (BIOS memory) 110; a screen 112; and a processing unit 114. The user-data storage medium 106 contains an Operating System code (OS code) 116 which is executed by the processing unit 114 and includes the code 118 for anti-theft software. A Basic Input/Output System is established by executing the codes stored in the BIOS memory 110.

The server 104 includes a processing unit 120 and contains a lost list 122. Based on the lost list 122, the processing unit 120 executes the code 124 of loss-detection software.

When the personal electronic device 102 gets lost, the owner reports the internet-communication address MAC of the lost personal electronic device 102 to the vendor to update the lost list 122 to contain the internet-communication address MAC of the lost personal electronic device 102. According to the loss-detection software (referring to the code 124), the server 104 searches the internet repeatedly for the internet-communication address MAC recorded in the lost list 122. For example, the server 104 may search the internet by issuing a command "ping" repeatedly (e.g., in a regular time schedule or according to a specific criterion), to ping the internet-communication address MAC of the lost personal electronic device 102. Once the lost personal electronic device 102 is connected to the internet, the server 104 detects the lost personal electronic device 102 and thereby the anti-theft software (referring to the code 118) designed within the Operating System of the personal electronic device 102 is activated. According to the anti-theft software (referring to the code 118), the processing unit 114 operates the Basic Input/Output System of the personal electronic device 102 to assert a lost flag 126 in the BIOS memory 110 and sets a medium password 128 into the user-data storage medium 106 and stores the recovery information (i.e. the medium password 130, to be read out by a recovery machine that the vendor of the personal electronic device 102 designed for the lost devices) into the BIOS memory 110. With the asserting of the lost flag 126, the Basic Input/Output System of the personal electronic device 102 forces the personal electronic device 102 to reset. During a Power-On Self-Test (POST) of the reset personal electronic device 102, the asserted lost flag 126 is detected and thereby the reset personal electronic device 102 is prohibited from starting the Operating System. The user-data storage medium 106 is well protected even if the user-data storage medium 106 is disassembled from the locked personal electronic device 102 and assembled to another computing system. In another exemplary embodiment, the Basic Input/Output System operating in accordance with anti-theft software further sets a BIOS password 132 for itself. The medium password 130 and the BIOS password 132 may be stored into the SPI ROM of the BIOS memory 110.

In some exemplary embodiments, according to the asserted lost flag 126, the Basic Input/Output System uses the screen 112 to show a prohibition notice during the Power-On Self-Test, to show that the use of the personal electronic device 102 is prohibited and the personal electronic device 102 must be returned to the vendor for system recovery.

In some exemplary embodiments, the anti-theft software calls a System Management Interrupt (SMI) to operate the Basic Input/Output System to assert the lost flag 126 and then the personal electronic device 102 is forced to reset and the medium password 128 and medium password 130 (or even the BIOS password 132) are set during the Power-On Self-Test of the reset personal electronic device 102 due to the asserted lost flag 126. The lost flag 126 may be deasserted by a recovery machine of the vendor of the personal electronic device 102, after the medium password 130 is retrieved and unlocked by the recovery machine.

Figure 2:
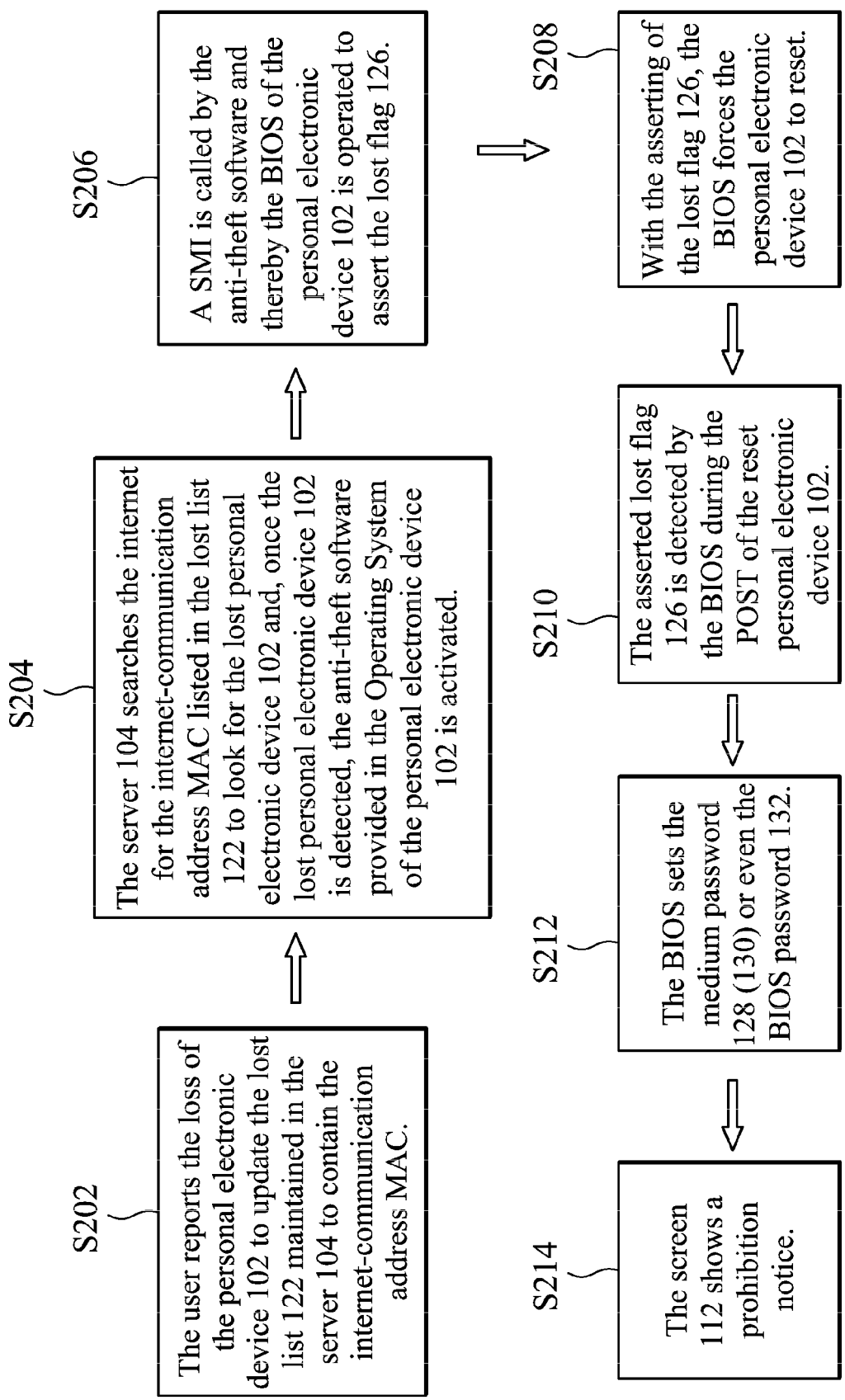
FIG. 2 shows a data-theft prevention procedure for a personal electronic device of the disclosure with respect to the architecture of FIG. 1.

FIG. 2 shows a data-theft prevention procedure for the personal electronic device of the disclosure with respect to the architecture of FIG. 1. When the personal electronic device 102 gets lost, the user must report the loss of the personal electronic device 102 by step S202, to update the lost list 122 maintained in the server 104 to contain the internet-communication address MAC of the personal electronic device 102. In step S204, the server 104 searches the internet for the internet-communication address MAC listed in the lost list 122 to look for the lost personal electronic device 102. The anti-theft software provided in the Operating System of the personal electronic device 102 is activated once the server 104 detects the internet-communication address MAC of the personal electronic device 102 through the internet. In step S206, a System Management Interrupt is called by the anti-theft software and thereby the Basic Input/Output System of the personal electronic device 102 is operated to assert the lost flag 126. With the asserting of the lost flag 126, the Basic Input/Output System forces the personal electronic device 102 to reset in step S208. In step S210, the asserted lost flag 126 is detected by the Basic Input/Output System during the Power-On Self-Test of the reset personal electronic device 102. In step S212, the Basic Input/Output System sets the medium password 128 (130) or even the BIOS password 132 in response to the asserted lost flag 126. In step S214, the Basic Input/Output System prohibits the personal electronic device 102 from starting the Operating System and further drives the screen 112 of the personal electronic device 102 to show a prohibition notice which contains a message that the use of the personal electronic device 102 is prohibited.

Figure 3:
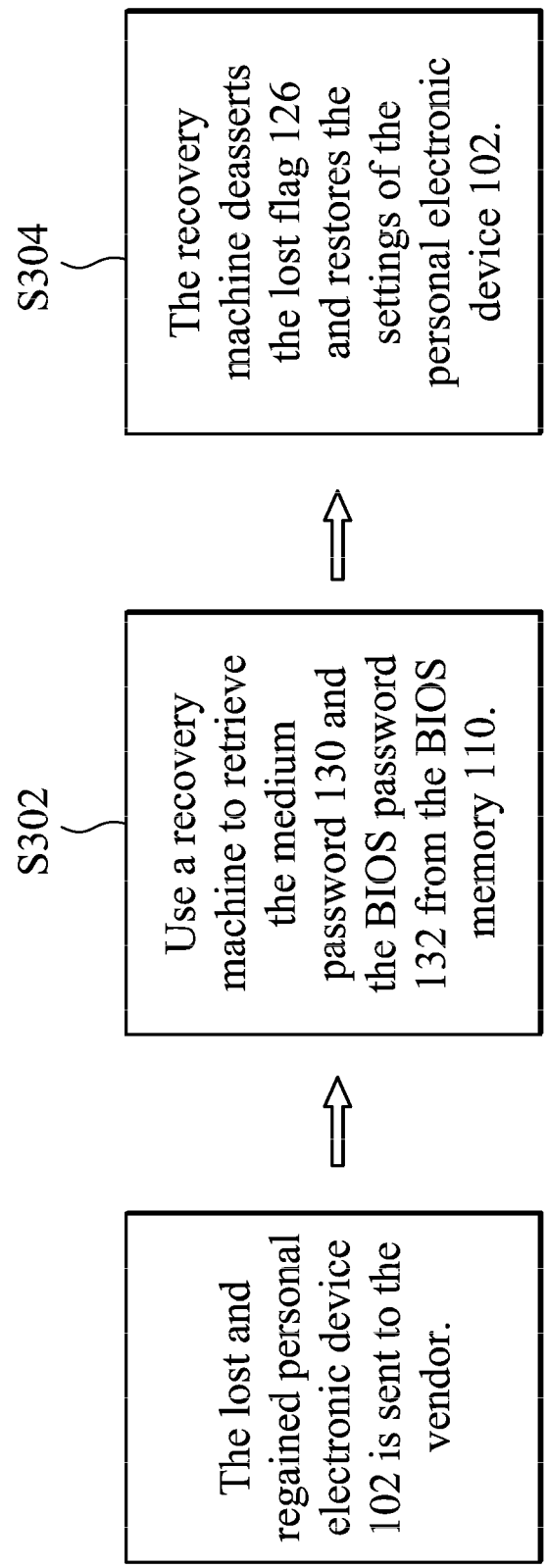
FIG. 3 shows a recovery procedure for a lost and regained personal electronic device with respect to the architecture of FIG. 1.

FIG. 3 shows a recovery procedure for a lost and regained personal electronic device with respect to the architecture of FIG. 1. For the lost and regained personal electronic device 102, the vendor uses a recovery machine in accordance with step S302 to retrieve the medium password 130 and the BIOS password 132 from the BIOS memory 110. In step S304, the recovery machine deasserts the lost flag 126 and restores the settings of the personal electronic device 102.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A personal electronic device, comprising:
    a user-data storage medium;
    an internet-communication interface with an internet-communication address of the personal electronic device;
    a Basic Input/Output System memory; and
    a processing unit, executing the codes contained in the Basic Input/Output System memory in accordance with anti-theft software when the internet-communication address of the personal electronic device is detected by a server through the internet and the server determines that the internet-communication address has been listed in a lost list, wherein by executing the codes contained in the Basic Input/Output System memory a medium password for the user storage medium is set and the personal electronic device is prohibited from use,
    wherein:
    the anti-theft software is operated in an Operating System of the personal electronic device and is activated when the internet-communication address of the personal electronic device is detected by the server and the server determines that the internet-communication address has been listed in the lost list;
    a System Management Interrupt is called by the anti-theft software to operate a Basic Input/Output System of the personal electronic device to set the medium password;
    the Basic Input/Output System further loads the medium password into the Basic Input/Output System memory which is also loaded into the user storage medium; and
    the medium password contained in the Basic Input/Output System memory is to be read out by a recovery machine of a vendor of the personal electronic device.

2. The personal electronic device as claimed in claim 1, wherein:
    according to the System Management Interrupt called by the anti-theft software, the Basic Input/Output System further asserts a lost flag of the Basic Input/Output System;
    with the asserting of the lost flag, the Basic Input/Output System forces the personal electronic device to reset; and
    when the asserted lost flag is detected during a Power-On Self-Test of the reset personal electronic device, the Basic Input/Output System prohibits the reset personal electronic device from starting an Operating System of the personal electronic device.

3. The personal electronic device as claimed in claim 2, wherein:
the lost flag is deasserted by the recovery machine when the medium password is retrieved and unlocked by the recovery machine.

4. The personal electronic device as claimed in claim 2, wherein:
the Basic Input/Output System sets the medium password with the asserting of the lost flag.

5. The personal electronic device as claimed in claim 1, wherein:
when the internet-communication address of the personal electronic device is detected by the server and the server determines that the internet-communication address has been listed in the lost list, the processing unit operates the Basic Input/Output System in accordance with the anti-theft software to set a Basic Input/Output System password of the Basic Input/Output System.

6. The personal electronic device as claimed in claim 1, further comprising:
a screen,
wherein the Basic Input/Output System further drives the screen to show a prohibition message which contains a message that the use of the personal electronic device is prohibited.

7. A data-theft prevention system for a personal electronic device, comprising:
the personal electronic device as claimed in claim 1, and the server,
wherein:
the server contains the lost list;
the internet-communication address of the personal electronic device is updated into the lost list when the personal electronic device gets lost and the loss of the personal electronic device is reported, and
the server looks for the lost personal electronic device by searching the internet for the internet-communication address listed in the lost list.

8. A data-theft prevention method for a personal electronic device, comprising:
loading an internet-communication interface of the personal electronic device with an internet-communication address of the personal electronic device;
installing anti-theft software onto the personal electronic device; and
when the internet-communication address of the personal electronic device is detected by a server through the internet and the server determines that the internet-communication address has been listed in a lost list, executing the codes contained in a Basic Input/Output System memory of the personal electronic device in accordance with the anti-theft software to set a medium password for the user storage medium and prohibit the user of the personal electronic device,
wherein:
the anti-theft software is operated in an Operating System of the personal electronic device and is activated when the internet-communication address of the personal electronic device is detected by the server and the server determines that the internet-communication address has been listed in the lost list;
a System Management Interrupt is called by the anti-theft software for operating a Basic Input/Output System of the personal electronic device to set the medium password;
the Basic Input/Output System further loads the medium password into the Basic Input/Output System memory which is also loaded into the user storage medium; and
the medium password contained in the Basic Input/Output System memory is to be read out by a recovery machine of a vendor of the personal electronic device.

9. The data-theft prevention method as claimed in claim 8, wherein:
according to the System Management Interrupt called by the anti-theft software, the Basic Input/Output System further asserts a lost flag of the Basic Input/Output System;
with the asserting of the lost flag, the Basic Input/Output System forces the personal electronic device to reset; and
when the asserted lost flag is detected during a Power-On Self-Test of the reset personal electronic device, the Basic Input/Output System prohibits the reset personal electronic device from starting an Operating System of the personal electronic device.

10. The data-theft prevention method as claimed in claim 9, wherein:
the lost flag is deasserted by the recovery machine when the medium password is retrieved and unlocked by the recovery machine.

11. The data-theft prevention method as claimed in claim 9, wherein:
the Basic Input/Output System sets the medium password with the asserting of the lost flag.

12. The data-theft prevention method as claimed in claim 8, wherein:
when the internet-communication address of the personal electronic device is detected by the server and the server determines that the internet-communication address has been listed in the lost list, the Basic Input/Output System sets a Basic Input/Output System password of the Basic Input/Output System in accordance with the anti-theft software.

13. The data-theft prevention method as claimed in claim 8, wherein:
the Basic Input/Output System further drives a screen of the personal electronic device to show a prohibition notice which contains a message that the use of the personal electronic device is prohibited.

14. The data-theft prevention method as claimed in claim 8, wherein:
the server contains the lost list;
the internet-communication address of the personal electronic device is updated into the lost list when the personal electronic device gets lost and the loss of the personal electronic device is reported, and
the server searches the internet for the internet-communication address listed in the lost list to look for the lost personal electronic device.

* * * * *